Nov. 30, 1954     W. A. BEDFORD, JR     2,695,435
TRIM FASTENING DEVICE
Filed Feb. 9, 1952
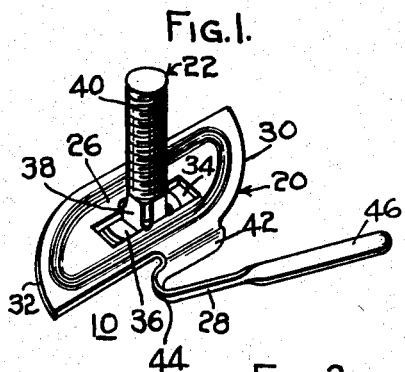
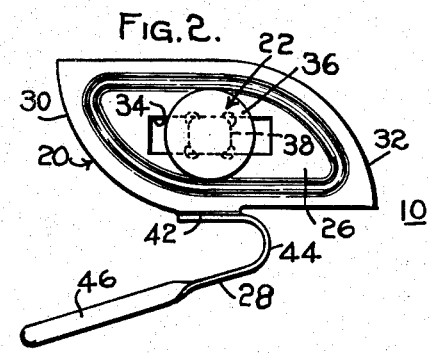
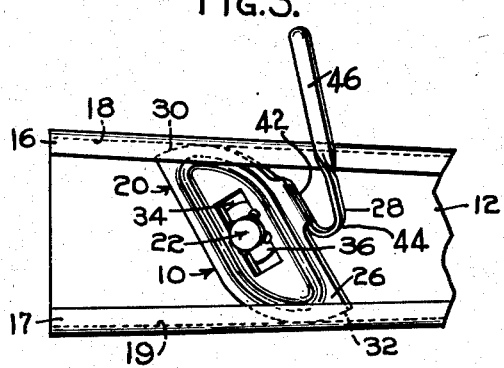
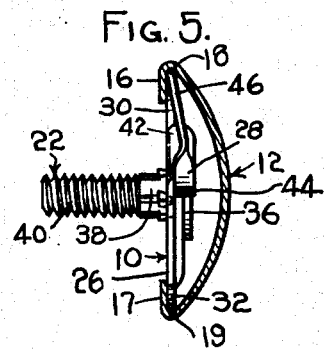
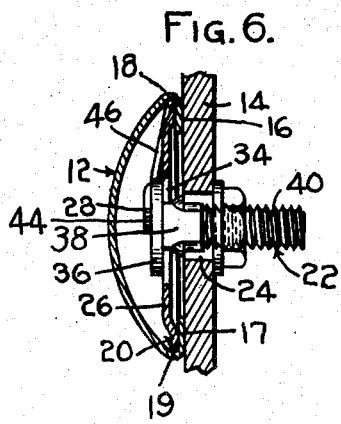
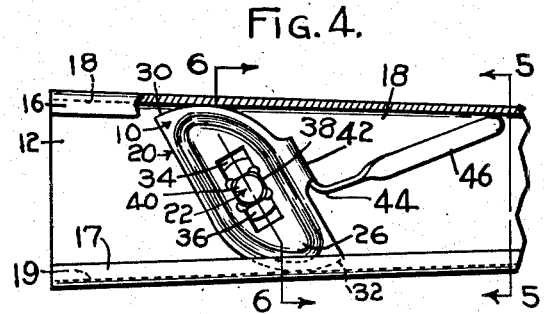
INVENTOR:
WILLIAM A. BEDFORD JR.,
BY Robert E Ross
AGENT.

United States Patent Office 2,695,435
Patented Nov. 30, 1954

2,695,435

TRIM FASTENING DEVICE

William A. Bedford, Jr., North Scituate, Mass., assignor to United-Carr Fastener Corporation, Cambridge, Mass., a corporation of Massachusetts Application February 9, 1952, Serial No. 270,860

1 Claim. (Cl. 24—73)

This invention relates generally to fastening devices, and has particular reference to fasteners for attaching moldings, metal trim, and the like to automobiles, aircraft, and other installations.

Moldings for motor vehicles and the like are frequently made of channeled construction of suitable cross-sectional shape and are provided with inwardly extending spaced flanges adapted to be clamped against the vehicle body by the cross-piece of a T-bolt type of fastener. Such fasteners are readily mounted in a desired position by inserting the cross-piece between the spaced flanges and then turning it so that the ends thereof pass behind the flanges to bear against a portion of the molding, so that the cross-piece is maintained in an inclined position in the molding, with the angle of inclination being greater in the more narrow moldings. Since such fasteners are frequently used in tapered moldings whose width varies along the axis of the molding, the cross-piece may be provided with diagonally opposite corners which are rounded to provide a smooth bearing surface at the ends thereof for such moldings of varying widths.

Previously known types of fasteners, such as those shown in my co-pending application Serial No. 197,052, filed November 22, 1950, have been found not adapted for assembly with certain types of moldings, particularly those having extremely narrow or V-shaped recesses.

In such cases, it has been found that although the fastener can be assembled so as to have adequate holding power, its position cannot be readily adjusted longitudinally in the molding, as is necessary to allow rapid assembly of the molding onto the vehicle, since portions of the fastener do not seat in the bottom of the molding recesses, but instead jam between the flange and the main body of the molding.

The object of the invention is to provide a molding fastener which is adapted for assembly into a channeled molding having narrow opposing recesses.

A further object of the invention is to provide a molding fastener which is provided with a single bearing surface at one end and a pair of relatively movable bearing surfaces at the other end in which all of said bearing surfaces are adapted to seat in the bottom of a narrow molding recess.

In the drawing:

Fig. 1 is a perspective view of a molding fastener embodying the features of the invention;

Fig. 2 is a plan view of the fastener of Fig. 1;

Fig. 3 is a plan view of the fastener of Fig. 1 illustrating the first step in the assembly of the fastener into a channeled molding;

Fig. 4 is a view similar to Fig. 3 in which the fastener is completely assembled with the molding;

Fig. 5 is a view in section taken on line 5—5 of Fig. 4; and

Fig. 6 is a view similar to Fig. 5 taken on line 6—6 of Fig. 4.

Referring to the drawing, there is illustrated a molding fastener 10, which is adapted for assembly with a molding 12, to enable the molding to be attached to a supporting panel 14. The molding with which the fastener is best adapted for use is generally channel shaped, with inturned edges 16 and 17 at opposite sides thereof forming opposing narrow V-shaped recesses 18 and 19.

The fastener 10 comprises generally a molding-engaging portion 20 and a panel-engaging portion such as a bolt 22 or the like for insertion through an opening 24 in the supporting panel. The molding-engaging portion 20 is particularly adapted for assembly into moldings of various widths, or into a tapered molding in which the width varies throughout the length thereof, and comprises generally a cross-plate 26 and a cantilever spring 28 attached thereto and extending alongside the cross-piece in the plane thereof. The cross-plate 26 has a length which is greater than the width of the molding 12 and a width less than the distance between the inturned edges 16, whereby the cross-plate may be inserted between the inturned edges and rotated until the ends thereof pass into the opposing recesses 18 and bear against the molding, so that the cross-plate is maintained in an inclined position in relation to the axis of the molding (see Fig. 3). The angle of inclination of the cross-plate from the transverse axis of the molding, as measured by a line drawn between the points of contact of the ends thereof with the molding, will vary with the width of the molding, and will be greater with narrower moldings.

To provide a smooth bearing surface for engagement with moldings of various sizes, the ends of the cross-plate are provided with diagonally opposite rounded portions 30 and 32, and to allow the bearing surfaces to seat in the recesses 18 and 19 they are preferably provided only by the edge of the cross-plate, so that said bearing surfaces are no thicker than the metal of which the plate is formed.

A slot 34 is provided centrally in the cross-piece to receive the bolt 22, and the slot 34 is preferably elongated along the major axis of the cross-piece. The bolt 22 is provided with a flat head 36 disposed on one side of the cross-piece, a square shank portion 38 extending through the slot 34, and a threaded shank portion 40 extending therefrom. The bolt is loosely assembled with the cross-piece by staking, that is, by mashing the corners of the square shank portion downwardly to protrude over the adjacent portion of the cross-piece, so that the bolt is retained in the slot but is slidable therein to permit the position of the bolt to be adjusted vertically in relation to the axis of the molding after assembly therewith.

In the illustrated embodiment the spring 28 is attached to one side of the plate approximately midway between the ends thereof by an integral tab 42 which extends substantially normal to the plate. The spring 28 comprises generally a U-shaped resilient portion 44 having a flat cross-section, the plane of which is substantially normal to the base, and a flat free-end portion 46, the plane of which is substantially parallel to the plane of the base. The free end 46 extends generally alongside and slightly away from the adjacent edge of the plate. The U-shaped portion 44 allows the free end 46 to flex laterally in a direction substantially parallel to the plane of the cross-piece, so that the free end moves toward and away from the bearing portion 30. The flexing of the spring 28 in this manner varies the overall height of the molding-engaging portion, that is, the distance between the lower bearing portion 32 and a line connecting the upper bearing portion 30 and the free end portion 48, so that the molding-engaging portion may adjust itself to moldings of various widths. The molding-engaging portion is thus provided with a single bearing portion for bearing against one inturned edge of the molding, and spaced bearing portions for bearing against the opposite inturned edge of the molding, said spaced bearing portions being movable relative to each other with a scissors action, so that the distance therebetween depends on the width of the molding into which the device is inserted, with the distance being greater in the case of smaller moldings.

To assemble the molding-engaging portion into the molding, the cross-plate 26 is inserted between the inturned edges 16 and rotated until the rounded bearing portions 30 and 32 pass into the opposing recesses 18 and 19 respectively and engage the opposite sides of the molding (see Fig. 3). The spring 28 is then flexed laterally away from the cross-plate until the free end 48 is able to pass under the adjacent inturned edge and snap into the recess 18 in spaced relation longitudinally of the molding to the rounded bearing portion 30 of the cross-plate (see Fig. 4). After such assembly, the spring and the cross-plate tend to close with a scissor action, which tends to increase the overall height of the molding-engaging portion, to securely retain it in engagement with the molding.

An important feature of the present invention is the provision of narrow bearing portions, no wider than the thickness of the metal from which the device is formed, so that each bearing portion is able to seat in the bottom of the channel recesses without binding or jamming between the inturned edges and the main body of the molding. Hence, when the fastener is assembled into a tapered molding, it may easily be slid longitudinally therein to properly position the bolt 22 for entering the opening 24 in the supporting panel. For example, when the molding-engaging portion is slid longitudinally into a smaller portion of the molding, as illustrated in Fig. 6, the cross-plate rotates to increase the angle of inclination thereof to the transverse axis of the molding, and the spring 28 flexes further outwardly away from the cross-plate, increasing the distance between the free end 48 of the spring and the upper rounded bearing portion 30.

The fastener is not only adapted for use with tapered moldings, but may also be used in moldings of uniform width, and has the further advantage that only one size of molding fastener is required to be manufactured and stocked for use with many different sizes of moldings.

Since certain obvious modifications may be made in the device without departing from the scope of the invention, it is intended that all matter contained herein be interpreted in an illustrative and not in a limiting sense.

I claim:

A fastening device for assembly with a strip of molding or the like which has inturned flanges along the edge forming narrow recesses, said device comprising an elongated plate having diagonally opposite rounded corners forming narrow edges for entering the narrow recesses in the molding, a tab joined to one side of the plate intermediate the ends thereof, said tab extending substantially perpendicular to the plate, and a spring arm extending from the tab, said arm comprising a U-shaped portion having one end joined to the tab, said U-shaped portion having a substantially flat cross-section, the plane of which is perpendicular to the plane of the plate and a flat tongue portion extending from the other end of the U-shaped portion, the plane of said flat tongue portion being substantially parallel to the plane of the plate, and means disposed on the plate to enable it to be attached to a support.

References Cited in the file of this patent

UNITED STATES PATENTS

| Number | Name | Date |
| --- | --- | --- |
| 2,254,310 | Place | Sept. 2, 1941 |
| 2,515,895 | Poupitch | July 18, 1950 |
| 2,531,348 | Amesbury | Nov. 21, 1950 |
| 2,531,351 | Churchill | Nov. 21, 1950 |